United States Patent
Lai et al.

(10) Patent No.: US 9,201,202 B2
(45) Date of Patent: Dec. 1, 2015

(54) QSFP TO SFP+ ADAPTER CABLE

(75) Inventors: David Lai, Mountain View, CA (US);
Norman Tang, Los Altos, CA (US);
Liang Ping Peng, Santa Clara, CA (US);
Anthony Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 881 days.

(21) Appl. No.: 13/448,870

(22) Filed: Apr. 17, 2012

(65) Prior Publication Data
US 2013/0272348 A1 Oct. 17, 2013

(51) Int. Cl.
*G02B 6/42* (2006.01)
*H04B 10/40* (2013.01)
*H04B 3/00* (2006.01)
*H01R 13/66* (2006.01)

(52) U.S. Cl.
CPC ............... *G02B 6/4246* (2013.01); *H04B 3/00* (2013.01); *H04B 10/40* (2013.01); *G02B 6/4293* (2013.01); *H01R 13/6616* (2013.01); *H01R 13/6658* (2013.01)

(58) Field of Classification Search
None
See application file for complete search history.

(56) References Cited

U.S. PATENT DOCUMENTS

| 7,447,440 | B2 | 11/2008 | Theodoras, II | |
|---|---|---|---|---|
| 8,075,199 | B2 | 12/2011 | Losio et al. | |
| 2010/0302754 | A1* | 12/2010 | Nordin et al. | 361/810 |
| 2011/0130032 | A1* | 6/2011 | Mazzini et al. | 439/502 |
| 2011/0135312 | A1* | 6/2011 | El-Ahmadi et al. | 398/135 |

OTHER PUBLICATIONS

Arista (SFP/SFP+ Optic Modules and Cables), 2008.*

* cited by examiner

*Primary Examiner* — Leon-Viet Nguyen
(74) *Attorney, Agent, or Firm* — Edell, Shapiro & Finnan LLC

(57) ABSTRACT

Techniques are provided for sending and receiving data communications across management data channels. The techniques comprise a quad small form-factor pluggable (QSFP) transceiver module configured to send and receive a plurality of data signals, a plurality of enhanced small form-factor pluggable (SFP+) transceiver cage devices, and a plurality of management cables. Each of the SFP+ transceiver cage devices is configured to interface with an SFP+ transceiver module. Each of the management cables is configured to interface with the QSFP transceiver module and corresponding ones of the SFP+ transceiver cage devices. Furthermore, each of the management cables operates as a data channel to manage data flow between the QSFP transceiver module and the corresponding ones of the SFP+ transceiver cage devices.

15 Claims, 5 Drawing Sheets

US 9,201,202 B2

QSFP TO SFP+ ADAPTER CABLE

TECHNICAL FIELD

The present disclosure relates to data transmissions between a quad small form-factor pluggable (QSFP) transceiver module and a plurality of the enhanced small form-factor pluggable (SFP+) transceiver modules.

BACKGROUND

Multiple Source Agreement (MSA) specifications for a quad small-form factor pluggable (QSFP) transceiver defines a hot-pluggable module that integrates four transmit and four receive channels with a standard multi-fiber push-on (MPO) parallel optical connector for high-density applications. Due to power and thermal challenges, however, the QSFP module can transmit data across only short distances. As such, the QSFP is limited to short reach data center applications. A QSFP to SFP+ "octopus" apparatus extends the reach by allowing users to use four separate SFP+ modules as long reach uplinks in a QSFP host port.

DESCRIPTION OF EXAMPLE EMBODIMENTS

Overview

Techniques are provided for sending and receiving data communications across management data channels. The techniques comprise a quad small form-factor pluggable (QSFP) transceiver module configured to send and receive a plurality of data signals, a plurality of enhanced small form-factor pluggable (SFP+) transceiver cage devices and a plurality of management cables. Each of the SFP+ transceiver cage devices is configured to interface with an SFP+ transceiver module. Each of the management cables is configured to interface with the QSFP transceiver module and corresponding ones of the SFP+ transceiver cage devices. Furthermore, each of the management cables operates as a data channel to manage data flow between the QSFP transceiver module and the corresponding ones of the SFP+ transceiver cage devices.

Example Embodiments

Figure 1:
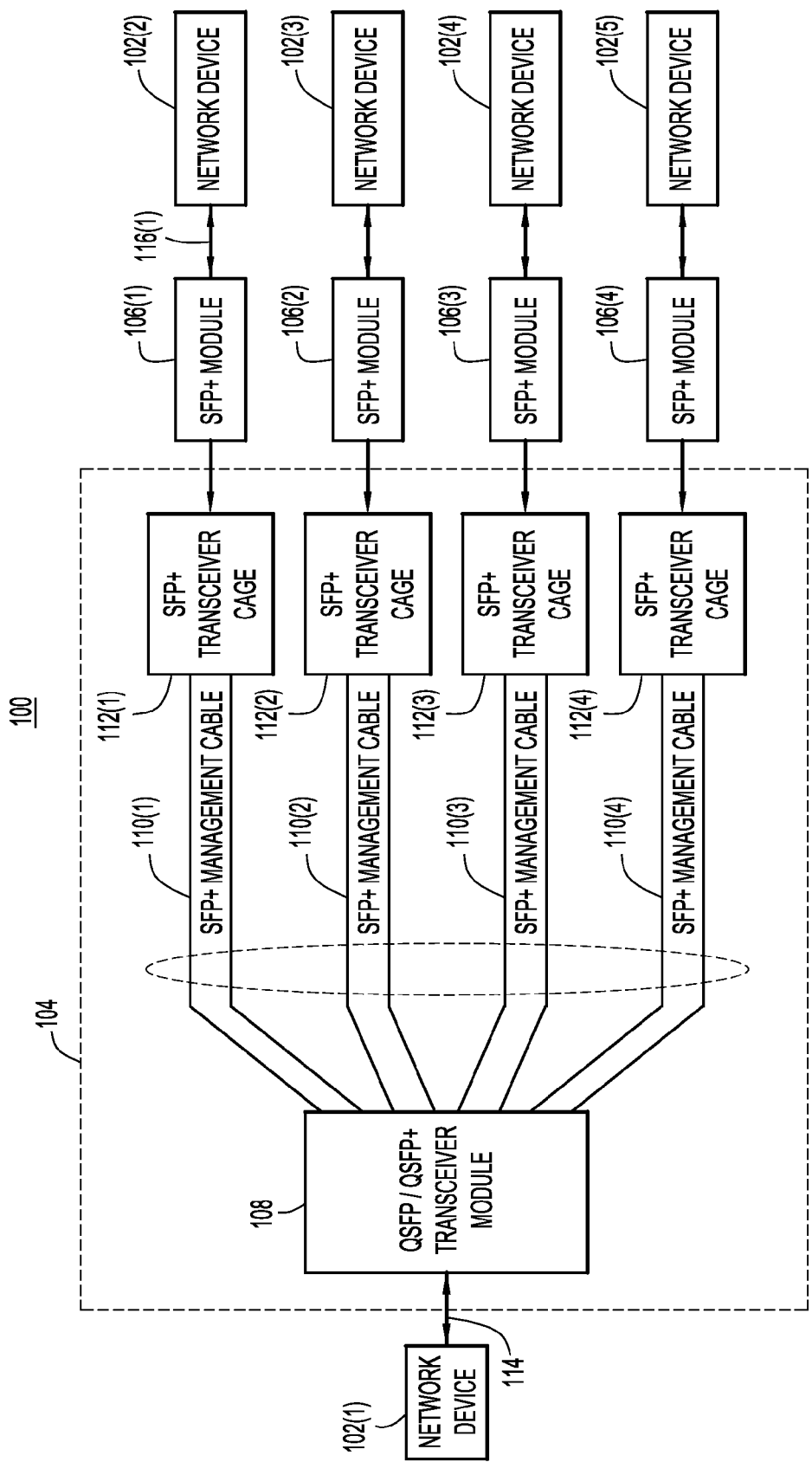
FIG. 1 shows an example topology depicting a data communication device that comprises quad small form-factor pluggable (QSFP) transceiver module, a plurality of data management cables and a plurality of enhanced small form-factor pluggable (SFP+) cage devices for data communications between the QSFP transceiver module and SFP+ transceiver modules.

The techniques described herein are directed to sending and receiving data communications across management data channels between a quad small form-factor pluggable (QSFP) transceiver module and a plurality of small form-factor pluggable (SFP+) transceiver modules. An example topology 100 is illustrated in FIG. 1. In FIG. 1, the topology 100 has a plurality of network devices, shown at reference numerals 102(1)-102(5). The topology 100 also has a data communication device or system, shown at reference numeral 104, and a plurality of enhanced SFP+ transceiver modules, shown at reference numerals 106(1)-106(4). The data communication system comprises a QSFP transceiver module 108, a plurality of SFP+ management cables 110(1)-110(4) and a plurality of SFP+ transceiver cage devices 112(1)-112(4). It should be appreciated that the QSFP transceiver module 108 may be a standard QSFP transceiver module or an enhanced QSFP (QSFP+) transceiver module, as defined by multiple source agreement (MSA) standards and the Institute of Electrical and Electronic Engineers (IEEE) standards. For simplicity, the terms QSFP transceiver module, SFP+ transceiver module, SFP+ management cables and SFP+ transceiver cage devices are used hereinafter.

The network device 102(1) (e.g., "first host network device") is configured to exchange data communications with the QSFP transceiver module 108 of the data communication system 104, as shown by arrow 114. These data communications may be, for example, data communications in compliance with the ten gigabit Ethernet standard (hereinafter "10G," "10G data" or "10G data communications") or 40 gigabit Ethernet standard (hereinafter "40G," "40G data" or "40G data communications").

The network device 102(2) (e.g., "first system network device") is configured to exchange data communications with a first SFP+ transceiver module 106(1), as shown by arrow 116(1). These data communications may be, for example, 10G data communications. Similarly, the network devices 102(3) (e.g., "second system network device"), 102(4) ("third system network device") and 102(5) ("fourth system network device") are configured to exchange 10G data communications with respective second, third and fourth SFP+ transceiver modules 106(2)-106(4).

The SFP+ transceiver modules 106(1)-106(4) are configured to interface with corresponding SFP+ transceiver cage devices 112(1)-112(4) of the data communication system 104. For example, the SFP+ transceiver modules 106(1)-106(4) may plug into the SFP+ transceiver cage devices 112(1)-112(4) such that connector pins (not shown) on the SFP+ transceiver modules 106(1)-106(4) engage corresponding connector pins on the SFP+ transceiver cage devices 112(1)-112(4) to enable an electrical connection between the SFP+ transceiver modules 106(1)-106(4) and the SFP+ transceiver cage devices 112(1)-112(4). Data can be delivered from the QSFP transceiver module 108 (originating from network device 102(1)) to corresponding SFP+ transceiver modules 106(1)-106(4) (and ultimately destined for network devices 102(2)-102(5)) across the SFP management cables 110(1)-110(4). These communications are referred to hereinafter as host-to-system communications. Likewise, when the SFP+ transceiver modules 106(1)-106(4) are plugged into respective SFP+ transceiver cage devices 112(1)-112(4), data can be delivered from the SFP+ transceiver modules 106(1)-106(4)

(originating from respective network devices 102(2)-102(5)) to the QSFP transceiver module 108 (and ultimately destined for network device 102(1)). These communications are referred to hereinafter as system-to-host communications. The host-to-system communications may be 10G data communications destined for one or more network device 102(2)-102(5). Additionally, for host-to-system communications, the QSFP transceiver module 108 may receive 4×10G data communications from the network device 102(1) (e.g., 40G data communications) and send each 10G communication to the appropriate SFP transceiver module 106(1)-106(4) that is plugged into corresponding SFP+ transceiver cage devices 112(1)-112(4). Likewise, system-to-host communications may be 10G data communications destined for the network device 102(1). The network device 102(1) may receiver 4×10G data communications (e.g., 40G data communications) by receiving four 10G data communications from the network devices 102(2)-102(5).

As shown, the SFP+ management cables 110(1)-110(4) are configured to interface with the QSFP transceiver module 108 and the SFP+ transceiver cage devices 112(1)-112(4) to enable host-to-system communications and system-to-host communications. In other words, the SFP+ management cables 110(1)-110(4) operate as data channels between the QSFP transceiver module 108 and the corresponding ones of the plurality of SFP+ transceiver cage devices 112(1)-112(4) and manage data flow between the QSFP transceiver module 108 and the SFP+ transceiver cage devices 112(1)-112(4). For example, the data channels provided by the SFP+ management cables 110(1)-110(4) are active data channels that manage this data flow.

Figure 2:
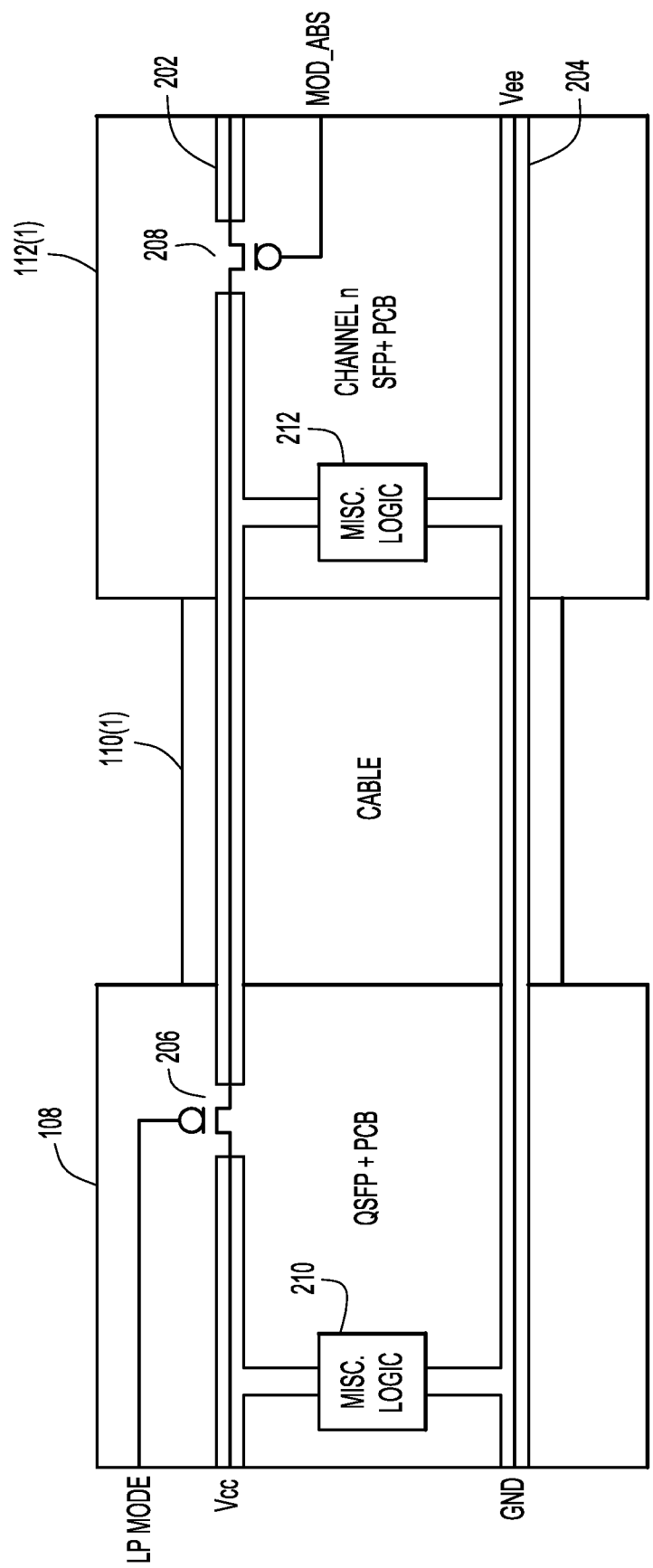
FIG. 2 shows an example power circuitry for the data communication device for power delivery between the QSFP transceiver module and the SFP+ transceiver modules that interface with the SFP+ transceiver cage devices.

Reference is now made to FIG. 2, which shows an example power circuitry for a single data management channel of the data communication device 104. In particular, FIG. 2 shows the QSFP transceiver module 108 in communication with the SFP+ transceiver cage device 112(1) across the SFP+ management cable 110(1). It should be appreciated that the SFP+ transceiver cage device 112(1) and the SFP+ management cable 110(1) are used as examples and that the circuitry depicted in FIG. 2 and described herein may be present in any of the SFP+ transceiver cage devices 112(1)-112(4) and SFP+ management cables 110(1)-110(4).

As shown in FIG. 2, a power supply path 202 runs from the QSFP transceiver module 108 to the SFP+ transceiver cage device 112(1) across the SFP+ management cable 110(1). Similarly, a ground path 204 runs from the QSFP transceiver module 108 to the SFP+ transceiver cage device 112(1) across the SFP+ management cable 110(1). The power supply path 202 is configured to deliver power from the QSFP transceiver module to one of the SFP+ transceiver modules 106(1)-106(4) (e.g., the SFP+ transceiver module 106(1)) when it is plugged into the SFP+ transceiver cage device 112(1). For example, the power supply path is configured to deliver power at a voltage level of 3.3 volts across the power supply path 202 to deliver power to a SFP+ transceiver module that is plugged into the SFP+ transceiver cage device 112(1). Also as shown in FIG. 2, the QSFP transceiver module 108 comprises a switch transistor unit 206 that is configured to operate as a current limiting device for low power delivery between the QSFP transceiver module 108 and the SFP+ transceiver cage device 112(1). Likewise, the SFP+ transceiver cage device 112(1) is also configured with a switch transistor unit 208 that is configured to prevent power leakage or power sparks between the power supply path 202 and the ground path 204 when no SFP+ transceiver device is plugged into the SFP+ transceiver cage device 110(1). In one example, the switch transistor units 206 and 208 are metal oxide semiconductor field effect transistors (MOSFETs). The power delivery from the QSFP transceiver module 108 to the SFP+ transceiver cage 112(1) is managed by a low power mode pin, which is controlled by the host system device 102(1).

FIG. 2 also shows the QSFP transceiver module 108 and the SFP+ transceiver cage device 112(1) configured with logic 210 and 212, respectively. The logic 210 and 212 may be logic stored in a computer-readable storage or memory device which may be executed by one or more processors residing within or interfaced with the QSFP transceiver module 108 and the SFP+ transceiver cage 112(1). Logic 210 and 212 may be, for example, active logic comprising management circuitry, as described in more detail herein. The management circuitry, in one example, may be powered or driven by a 3.3 volt power source along the power supply path 202.

Figure 3:
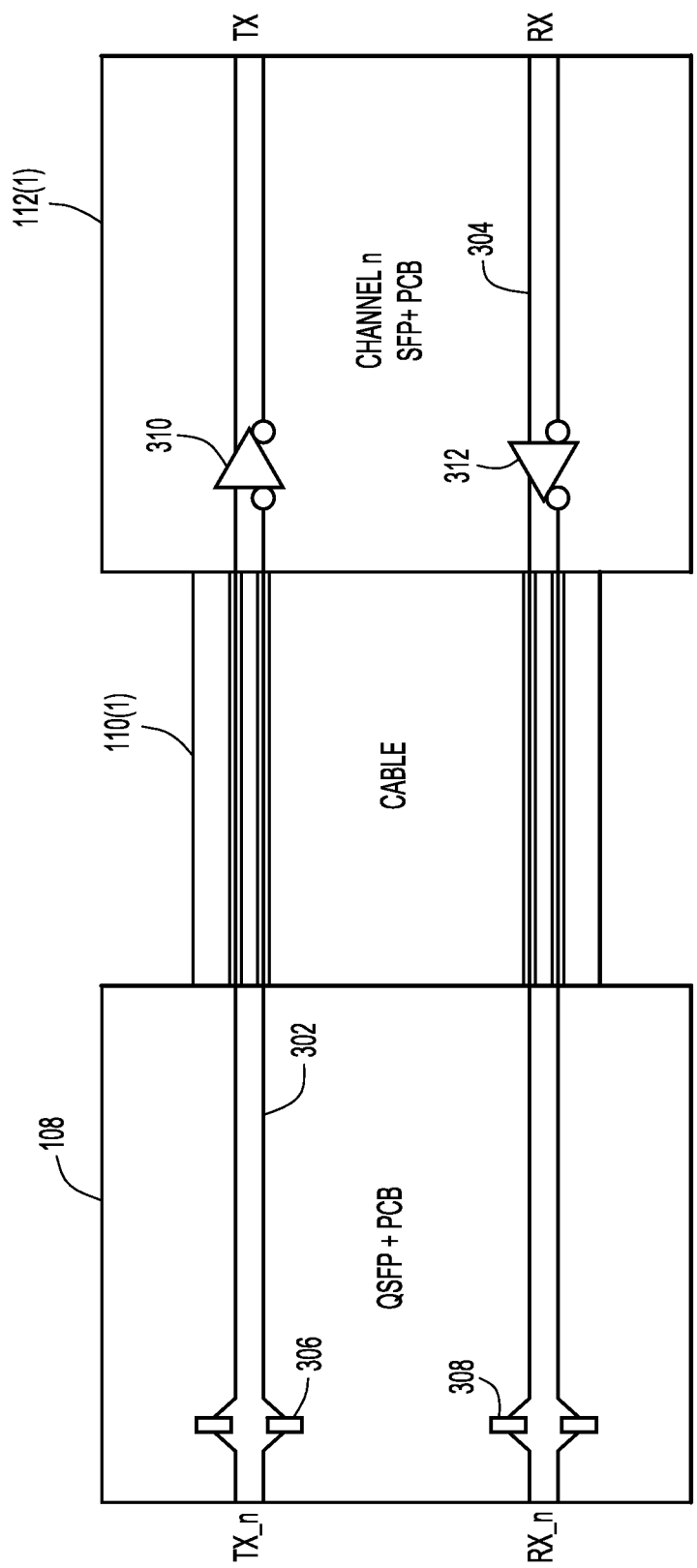
FIG. 3 shows an example circuitry for the data communication device for high-speed data communications between the QSFP transceiver module and the SFP+ transceiver modules that interface with the SFP+ transceiver cage devices.

Reference is now made to FIG. 3, which shows an example data communication circuitry from high-speed data communications between the QSFP transceiver module 108 and the SFP+ transceiver cage device 112(1). In particular, FIG. 3 shows the QSFP transceiver module 108 in communication with the SFP+ transceiver cage device 112(1) across the SFP+ management cable 110(1). As described above in connection with FIG. 2, it should be appreciated that the SFP+ transceiver cage device 112(1) and the SFP+ management cable 110(1) are used as examples in FIG. 3, and that the circuitry depicted in FIG. 3 and described herein may be present in any of the SFP+ transceiver cage devices 112(1)-112(4) and SFP+ management cables 110(1)-110(4).

As shown in FIG. 3, a transmission data communication path 302 runs from the QSFP transceiver module 108 to the SFP+ transceiver cage device 112(1) across the SFP+ management cable 110(1). The transmission data communication path 302 enables host-to-system communications (e.g., 10G data communications) between the QSFP transceiver 108 and one of the SFP+ transceiver modules 106(1)-106(4) (e.g., the SFP+ transceiver module 106(1)) that is plugged into the SFP+ transceiver cage device 112(1). Similarly, a reception data communication path 304 runs from the SFP+ transceiver cage device 112(1) to the QSFP transceiver module 108 across the SFP+ management cable 110(1). The reception data communication path 304 enables system-to-host data communications (e.g., 10G data communications) from the SFP+ transceiver module 106(1).

That is, 10G signals may be sent from the QSFP transceiver module 108 to the SFP+ transceiver cage device 112(1) (and to the SFP+ transceiver module 106(1) that is plugged into the SFP+ transceiver cage device 112(1)) along the transmission data communication path 302. Since each of the SFP+ management cables 110(1)-110(4) and SFP+ transceiver cage devices 112(1)-112(4) has this transmission data communication path, 10G data communications may be sent to each of the SFP+ transceiver cage devices 112(1)-112(4) (and corresponding SFP+ transceiver modules 106(1)-106(4)), thus enabling four 10G data communications (e.g., 4×10G or 40G data communications) to be sent from the QSFP transceiver module 108 to the SFP+ transceiver module 106(1)-106(4).

Similarly, 10G signals may be sent from the SFP+ transceiver cage device 112(1) (originating from the SFP+ transceiver module 106(1) plugged into the SFP+ transceiver cage device 112(1)) along the reception data communication path 304. Since each of the SFP+ management cables 110(1)-110(4) and SFP+ transceiver cage devices 112(1)-112(4) has this reception data communication path, 10G data communications may be sent from each of the SFP+ transceiver cage devices 112(1)-112(4) (originating from corresponding SFP+ transceiver modules 106(1)-106(4)), thus enabling four 10G data communications (e.g., 4×10G or 40G data communications) to be sent to the QSFP transceiver module 108.

FIG. 3 also shows the QSFP transceiver module 108 configured with a transmission direct current (DC) blocking device 306 and a reception DC blocking device 308. The SFP+ transceiver cage device 112(1) has a transmission clock data recovery (CDR) unit 310 and a reception CDR unit 312. The transmission DC blocking device 306 and the transmission CDR unit 310 allow alternating current (AC) signals to be delivered from the QSFP transceiver module 108 to the SFP+ transceiver cage device 112(1) (and ultimately to the SFP+ transceiver module 106(1) plugged into the SFP+ transceiver cage device 112(1)) along the transmission data communication path 302. The transmission CDR unit 310 also reduces jitter of these data communications. Likewise, the reception DC blocking device 308 and the reception CDR unit 312 allow AC signals to be delivered from the SFP+ transceiver cage device 112(1) (originating from the SFP+ transceiver module 106(1)) to the QSFP transceiver module 108. In one example, the transmission DC blocking device 306 and the reception DC blocking device 308 may be capacitors.

Figure 4:
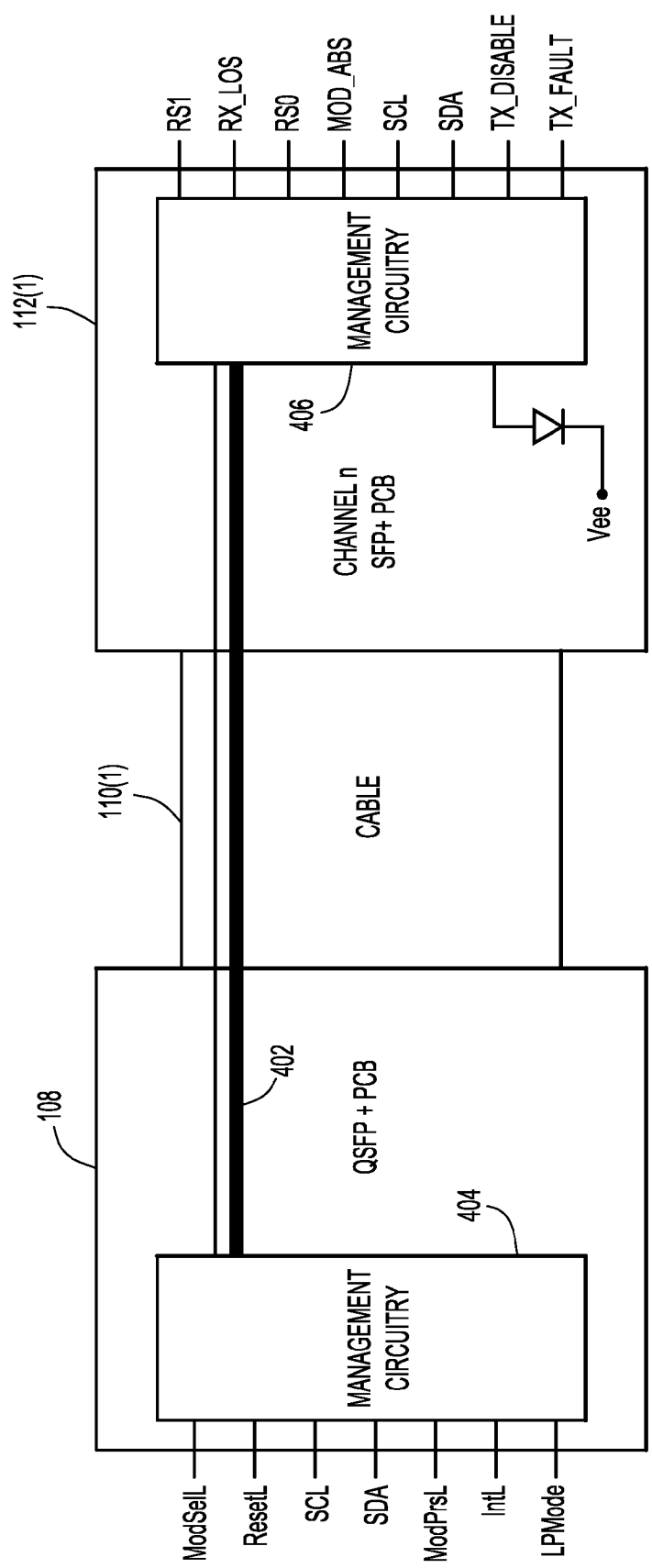
FIG. 4 shows an example circuitry for the data communication device for status and control signals mapped between the QSFP transceiver module and the SFP+ transceiver modules that interface with the SFP+ transceiver cage devices.

Reference is now made to FIG. 4, which shows an example circuitry for status and control signals sent between the QSFP transceiver module 108 and the SFP+ transceiver cage device 112(1). In particular, FIG. 4 shows the QSFP transceiver module 108 in communication with the SFP+ transceiver cage device 112(1) across the SFP+ management cable 110(1). It should be appreciated, however, that the SFP+ transceiver cage device 112(1) and the SFP+ management cable 110(1) are used as examples in FIG. 4, and that the circuitry depicted in FIG. 4 and described herein may be present in any of the SFP transceiver cage devices 112(1)-112(4) and SFP management cables 110(1)-110(4).

As shown in FIG. 4, a management data path 402 runs from the QSFP transceiver module 108 to the SFP+ transceiver cage device 112(1) across the SFP+ management cable 110(1). The QSFP transceiver module 108 is configured with management circuitry 404 that is configured to delivery management signals to management circuitry 406 of the SFP+ transceiver cage device 112(1). Likewise, the management circuitry 406 of the SFP+ transceiver cage device 112(1) is configured to deliver management signals to the management circuitry 404 of the QSFP transceiver module 108 across the management data path 402. The management signals (e.g., status and control signals) exchanged between the QSFP transceiver module 108 and the SFP+ transceiver cage device 112(1) enable the QSFP transceiver module to determine whether or not an SFP+ transceiver module (e.g., the SFP+ transceiver module 106(1)) has been plugged into the SFP+ transceiver cage device 112(1). The management data path 402 may be a high-speed management interface that can map information, such as identification programmable read only memory (IDPROM) contents. The high-speed management interface can also map status and control signals between the QSFP transceiver module 108 and the SFP+ transceiver cage device 112(1) with minimal lag time. FIG. 4 also shows an indicator device coupled to the management circuitry 406 of the SFP+ transceiver cage device 112(1). The indicator device indicates whether or not an SFP+ transceiver module has been plugged into the SFP+ transceiver cage device 112(1).

Figure 5:
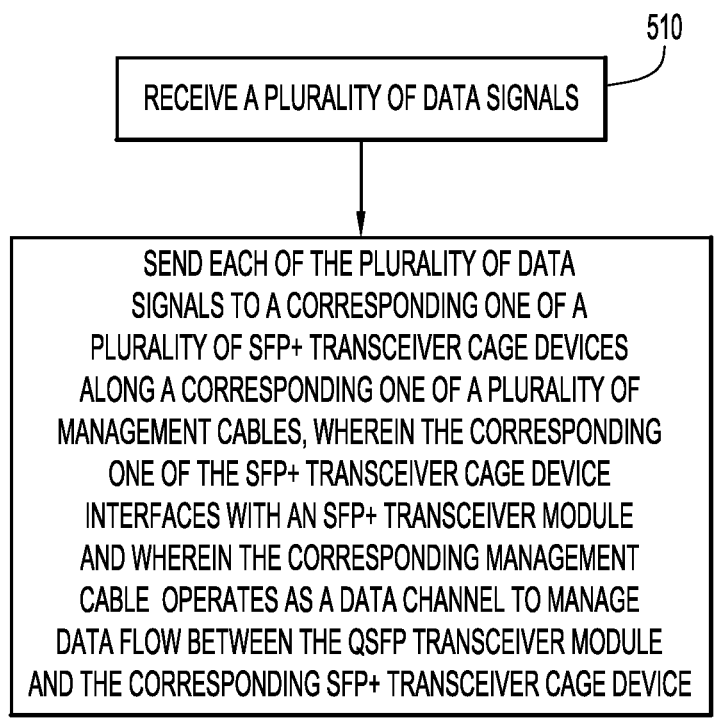
FIG. 5 shows an example flow chart depicting operations for data communications between the QSFP transceiver module and one or more SFP+ transceiver modules that interface with one or more of the SFP+ transceiver cage devices.

Reference is now made to FIG. 5, which shows an example flow chart depicting operations for data communications between the QSFP transceiver module 108 and one or more of the plurality of SFP+ transceiver modules 106(1)-106(4) (e.g., SFP+ transceiver module 106(1) that interfaces with one or more of the SFP+ transceiver cage devices 112(1)-112(4) (e.g., SFP+ transceiver cage device 112(1)). At reference numeral 510, the QSFP transceiver module 108 receives a plurality of data signals, e.g., from the network device 102(1) (host network device). At operation 520, each of the plurality of data signals is sent to a corresponding one of a plurality of SFP+ transceiver cage devices 112(1)-112(4) (e.g., SFP+ transceiver cage device 112(1)) along a corresponding one of a plurality of SFP+ management cables 110(1)-110(4) (e.g., SFP+ management cable 110(1)). The SFP+ transceiver cage device 110(1) interfaces with an SFP+ transceiver module (e.g., SFP+ transceiver module 106(1)), and the SFP+ management cable 110(1) operates as a data channel to manage data flow between the QSFP transceiver module and the corresponding SFP transceiver cage device 112(1).

It should be appreciated that the techniques described above in connection with all embodiments may be performed by one or more computer readable storage media that is encoded with software comprising computer executable instructions to perform the methods and steps described herein. For example, the operations performed by the adapter device 106 may be performed by one or more computer or machine readable storage media or device executed by a processor and comprising software, hardware or a combination of software and hardware to perform the techniques described herein.

In sum, an apparatus is provided comprising: a quad small form-factor pluggable (QSFP) transceiver module configured to send and receive a plurality of data signals; a plurality of enhanced small form-factor pluggable (SFP+) transceiver cage devices, wherein each of the SFP+ transceiver cage devices is configured to interface with an SFP+ transceiver module; and a plurality of management cables each of which is configured to interface with the QSFP transceiver module and corresponding ones of the plurality of SFP+ transceiver cage devices, wherein each of the plurality of management cables operates as a data channel to manage data flow between the QSFP transceiver module and the corresponding ones of the SFP+ transceiver cage devices.

In addition, a method is provided comprising: at a communication device, receiving a plurality of data signals at a quad small form-factor pluggable (QSFP) transceiver module; and sending each of the plurality of data signals to a corresponding one of a plurality of enhanced small form-factor pluggable (SFP+) transceiver cage devices along a corresponding one of a plurality of management cables, wherein the corresponding one of the SFP+ transceiver cage devices is configured to interface with an SFP+ transceiver module and wherein the corresponding one of the plurality of management cables operates as a data channel to manage data flow between the QSFP transceiver module and the corresponding SFP transceiver cage device.

Furthermore, a system is provided comprising: a host network device configured to send one or more data signals destined for one or more system network devices; a communication device comprising: a quad small form-factor pluggable (QSFP) transceiver module configured to receive the one or more data signals from the host network device; a plurality of management cables each of which is configured to interface with the QSFP transceiver module, wherein each of the plurality of management cables operates as a data channel to manage data flow of one or more data signals; a plurality of enhanced small form-factor pluggable (SFP+) transceiver cage devices, wherein each of the SFP+ transceiver cage devices is configured to interface with a corresponding one of the management cables; and a plurality of SFP transceiver modules, wherein each of the SFP transceiver modules is configured to interface with one of the management cables to receive the one or more data signals from the QSFP transceiver module.

The above description is intended by way of example only. Various modifications and structural changes may be made therein without departing from the scope of the concepts described herein and within the scope and range of equivalents of the claims.

What is claimed is:

1. An apparatus comprising:
a quad small form-factor pluggable (QSFP) transceiver module configured to send and receive a plurality of data signals;
a plurality of enhanced small form-factor pluggable (SFP+) transceiver cage devices, wherein each of the SFP+ transceiver cage devices is configured to interface with an SFP+ transceiver module; and
a plurality of management cables each of which is configured to interface with the QSFP transceiver module and corresponding ones of the plurality of SFP+ transceiver cage devices, wherein each of the plurality of management cables comprises:
a data communication path to manage data flow between the QSFP transceiver module and one of the SFP+ transceiver cage devices, wherein the QSFP transceiver module comprises a direct current (DC) blocking device coupled to the data communication path to allow alternating current (AC) signals to be delivered between the QSFP transceiver module and an SFP+ transceiver module that interfaces with the one of the SFP+ transceiver cage devices;
a power supply path extending from the QSFP transceiver module to the one of the SFP+ transceiver cage devices to deliver power from the QSFP transceiver module to an SFP+ transceiver module that interfaces with the one of the SFP+ transceiver cage devices, wherein the QSFP transceiver module comprises a current limiting switch coupled to the power supply path to selectively switch the power supply path to a low power mode; and
a management data path extending from the QSFP transceiver module to the one of the SFP+ transceiver cage devices to map status and control signals between the QSFP transceiver module and the one of the SFP+ transceiver cage devices.

2. The apparatus of claim 1, wherein each of the plurality of management cables is configured to operate as a ten gigabit per second data channel between the QSFP transceiver module and the corresponding ones of the plurality of SFP+ transceiver cage devices.

3. The apparatus of claim 2, wherein each of the plurality of management cables is configured to operate as the ten gigabit per second data channel to deliver data between the QSFP transceiver module and the corresponding ones of the plurality of SFP+ transceiver cage devices at extended distances of above ten kilometers.

4. The apparatus of claim 1, wherein the QSFP transceiver module is an enhanced QSFP (QSFP+) transceiver module.

5. The apparatus of claim 1, wherein each of the SFP+ transceiver cage devices further comprise a switch transistor configured to operate as a current limiting device.

6. The apparatus of claim 1, wherein each of the SFP+ transceiver cage devices is configured with a clock data recovery (CDR) unit.

7. A method comprising:
receiving a plurality of data signals, power, and status and control signals at a quad small form-factor pluggable (QSFP) transceiver module of a communication device; and
sending each of the plurality of data signals to a corresponding one of a plurality of enhanced small form-factor pluggable (SFP+) transceiver cage devices along a data communication path of a corresponding one of a plurality of management cables, wherein each corresponding one of the SFP+ transceiver cage devices is configured to interface with an SFP+ transceiver module and wherein the data communication path of each corresponding one of the plurality of management cables operates as a data channel to manage data flow between the QSFP transceiver module and the corresponding one of the SFP+ transceiver cage devices, wherein for each of the management cables, the QSFP transceiver module allows alternating current (AC) signals to be delivered between the QSFP transceiver module and the corresponding one of the SFP+ transceiver cage devices via a direct current (DC) blocking device coupled to the data communication path;
for each of the management cables, sending power along a power supply path of the management cable to delivery power from the QSFP transceiver module to a corresponding one of the SFP+ transceiver cage devices, wherein the QSFP transceiver module selectively switches the power supply path to a low power mode via a current limiting switch respectively coupled to the power supply path; and
for each of the management cables, mapping status and control signals sent along a management data path of the management cable between the QSFP transceiver module and a corresponding one of the SFP+ transceiver cage devices.

8. The method of claim 7, wherein sending each of the plurality of data signals comprises sending each of the plurality of data signals to the corresponding SFP+ transceiver cage device along the corresponding management cable configured to operate as a ten gigabit per second data channel between the QSFP transceiver module and the corresponding SFP+ transceiver cage device.

9. The method of claim 8, wherein sending each of the plurality of data signals along the corresponding management cable configured to operate as a ten gigabit per second data channel comprises sending each of the plurality of data signals along the corresponding management cable configured to deliver data between the QSFP transceiver module and the corresponding SFP+ transceiver cage device at extended distances of above ten kilometers.

10. The method of claim 7, wherein receiving comprises receiving the plurality of data signals at an enhanced QSFP (QSFP+) transceiver module.

11. The method of claim 7, wherein sending each of the plurality of data signals comprises sending each of the plurality of data signals along the data communication path of the corresponding one of the management cables to the corresponding one of the SFP+ transceiver cage devices configured with a clock data recovery (CDR) unit.

12. A system comprising:
a host network device configured to send one or more data signals destined for one or more system network devices;
a communication device comprising:
a quad small form-factor pluggable (QSFP) transceiver module configured to receive the one or more data signals from the host network device;
a plurality of management cables each of which is configured to interface with the QSFP transceiver module, wherein each of the plurality of management cables operates as a data channel to manage data flow of one or more data signals;
a plurality of enhanced small form-factor pluggable (SFP+) transceiver cage devices, wherein each of the SFP+ transceiver cage devices is configured to interface with a corresponding one of the management cables; and
a plurality of SFP+ transceiver modules, wherein each of the SFP+ transceiver modules is configured to interface with a corresponding one of the SFP+ transceiver modules to receive the one or more data signals from the QSFP transceiver module, wherein each of the plurality of management cables comprises:
- a data communication path to manage data flow between the QSFP transceiver module and one of the SFP+ transceiver cage devices, wherein the QSFP transceiver module comprises a direct current (DC) blocking device coupled to the data communication path to allow alternating current (AC) signals to be delivered between the QSFP transceiver module and one of the SFP+ transceiver modules that interfaces with the one of the SFP+ transceiver cage devices;
- a power supply path extending from the QSFP transceiver module to the one of the SFP+ transceiver cage devices to deliver power from the QSFP transceiver module to the one of the SFP+ transceiver modules that interfaces with the one of the SFP+ transceiver cage devices, wherein the QSFP transceiver module comprises a current limiting switch coupled to the power supply path to selectively switch the power supply path to a low power mode; and
- a management data path extending from the QSFP transceiver module to the one of the SFP+ transceiver cage devices to map status and control signals between the QSFP transceiver module and the one of the SFP+ transceiver cage devices.

13. The system of claim 12, wherein each of the plurality of management cables is configured to operate as a ten gigabit per second data channel between the QSFP transceiver module and the corresponding ones of the plurality of SFP+ transceiver cage devices.

14. The system of claim 12, wherein the QSFP transceiver module is an enhanced QSFP (QSFP+) transceiver module.

15. The system of claim 12, wherein each of the SFP+ transceiver cage devices is configured with a clock data recovery (CDR) unit.

* * * * *